Jan. 19, 1954   G. E. FLURSCHUTZ   2,666,624
INTERLOCKED SEAL FOR ROTARY REGENERATIVE PREHEATERS
Filed Feb. 18, 1950                           2 Sheets-Sheet 2
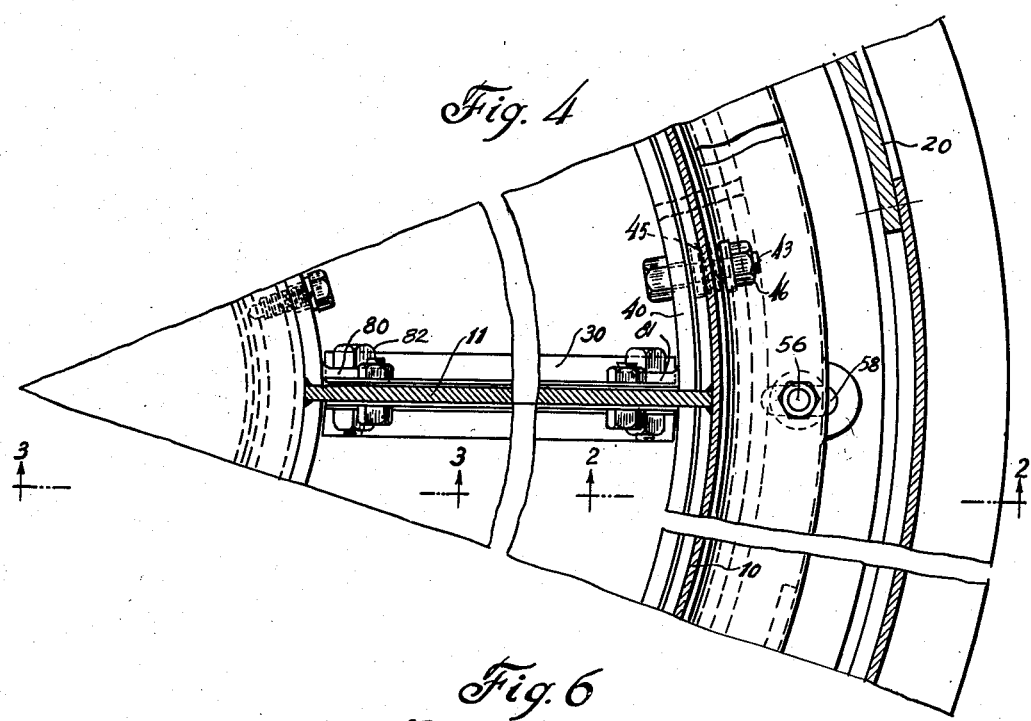
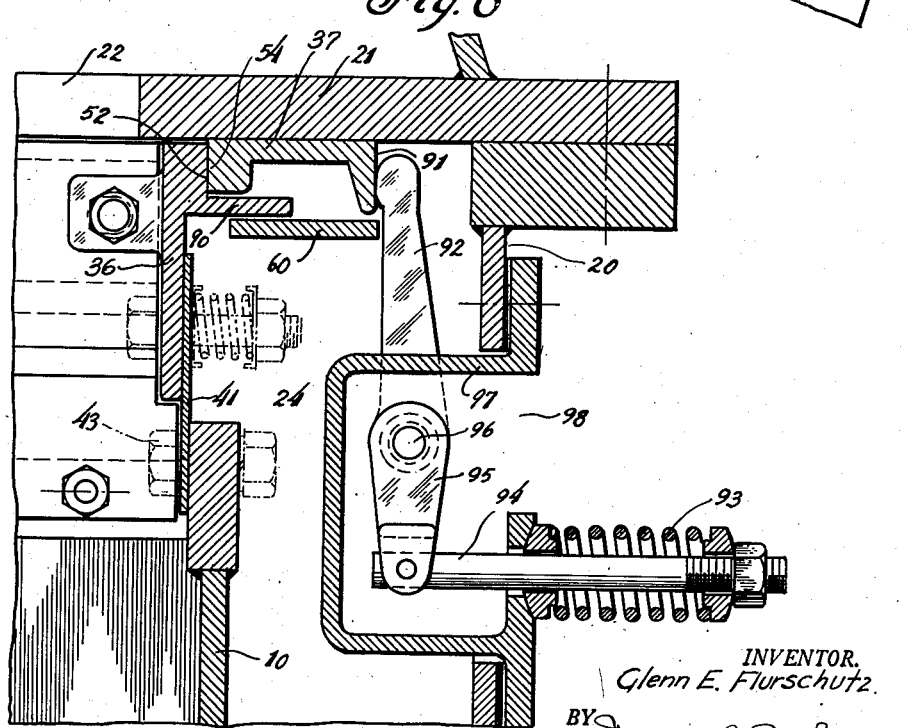
INVENTOR.
Glenn E. Flurschutz.
BY
ATTORNEY Patented Jan. 19, 1954

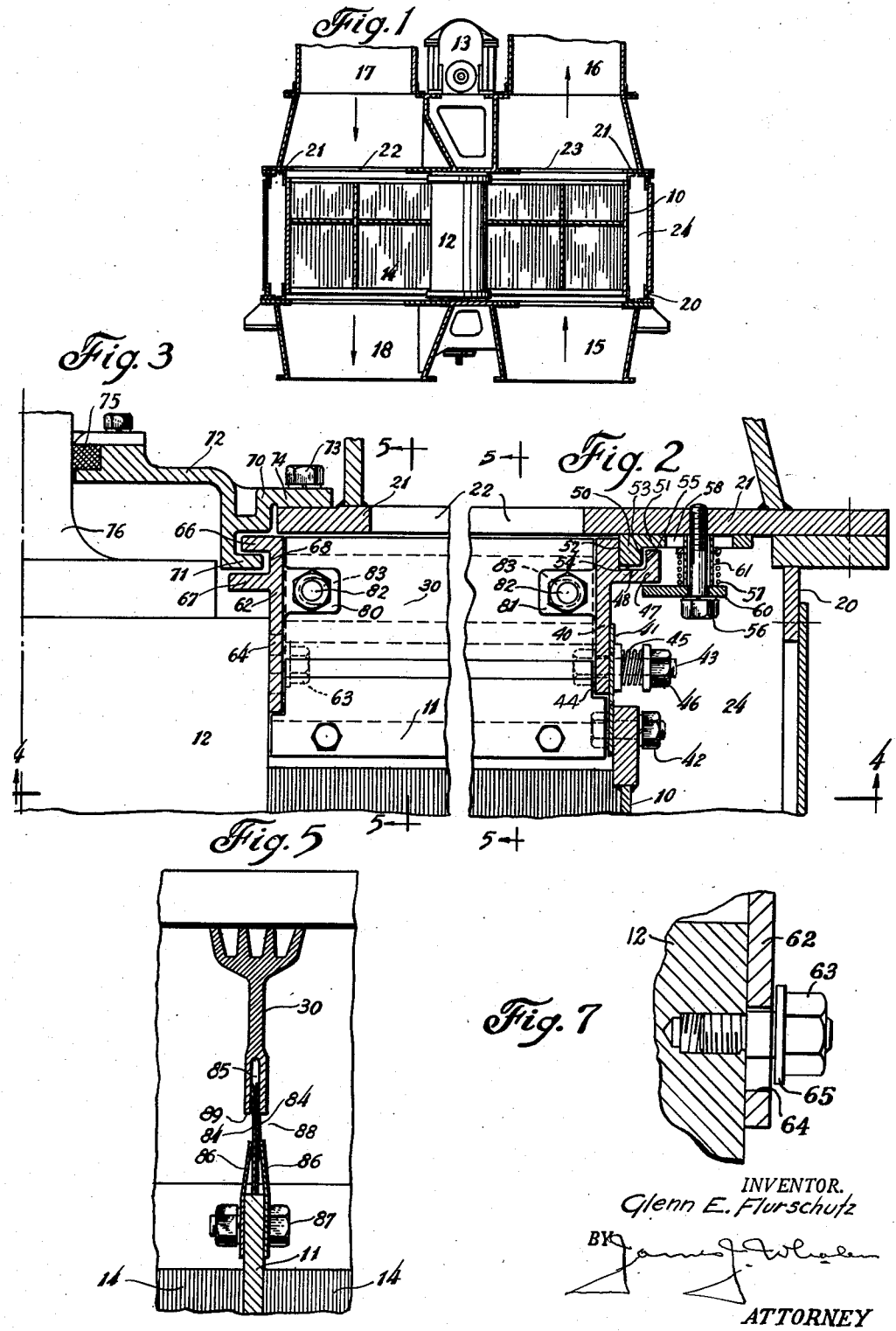

2,666,624

UNITED STATES PATENT OFFICE 2,666,624

INTERLOCKED SEAL FOR ROTARY REGENERATIVE PREHEATERS

Glenn E. Flurschutz, Wellsville, N. Y., assignor to The Air Preheater Corporation, New York, N. Y.

Application February 18, 1950, Serial No. 144,928

7 Claims. (Cl. 257—6)

The present invention relates to rotary regenerative air preheaters or like apparatus and particularly to improvements in radial and circumferential seals for use between the rotor and the housing in which it is enclosed.

In a rotary regenerative heater of the Ljungstrom type a cylindrical rotor has compartments that carry metallic heat transfer plates which as the rotor turns are first exposed to the heating gases and then disposed in the air passage to impart the absorbed heat to the air stream. The rotor is surrounded by a housing having end or sector plates formed with openings to provide for the flow of gas and air and in order to prevent the mixing of the streams of gas and air the radial partitions that divide the rotor into compartments are provided on their ends with seals that wipe against the confronting surfaces of the sector plates. To preclude the flow of gas or air through the clearance space between the side of the rotor and housing in a way to by-pass the heat transfer material it is customary to provide the rotor with circumferential seals that bear against the sector plates or other stationary parts.

The present invention contemplates the provision of improved radial and circumferential sealing devices of novel form especially adapted for use in air preheaters or the like utilized under conditions where high pressures are encountered.

In the drawings:

Figure 1 is a sectional elevational view in diagrammatic form of a rotary regenerative air preheater embodying the present invention;

Figure 2 is a sectional view on an enlarged scale illustrating the improved form of circumferential seal;

Figure 3 is a similar view showing a seal provided between the sector plate and the rotor post which constitutes the axis of rotation of the rotor;

Figure 4 is a sectional plan view on the line 4—4 in Figures 2 and 3 showing the relation of the radial seals to the circumferential seals;

Figure 5 is a sectional elevational view on an enlarged scale on the line 5—5 in Figures 2 and 3 illustrating the construction of the radial seal;

Figure 6 is an enlarged view similar to Fig. 2 showing another form of the circumferential seal; and Figure 7 is an enlarged sectional view illustrating the means used for allowing relative movement between the rotor post and the sealing member.

In the drawings the numeral 10 designates the cylindrical shell of a rotor that is divided into sector shaped compartments by radial partitions 11 connecting it with the rotor post 12 which is driven by a motor and reduction gearing 13 to turn the rotor slowly about its axis. The rotor compartments contain regenerative heat transfer material in the form of metallic plates 14 spaced to provide passages for the flow of gases from which they first absorb heat. The hot gases enter the preheater through a duct 15 from a boiler or other source and are discharged after passing over the heat transfer plates 14 through an outlet duct 16 to which an induced draft fan is connected. As the rotor turns slowly about its axis, the heated plates 14 are moved into the stream of air admitted through the duct 17 to which a forced draft fan is connected. After passing over the plates 14 and absorbing heat therefrom the stream of air is conveyed to the boiler furnace or other place of use through a duct 18.

A housing 20 enclosing the rotor 10 is provided at either end opposite the latter with end or sector plates 21 which are apertured at 22 and 23 to permit the streams of gas and air to flow through the rotor of the preheater. The sector plate 21 is an annulus provided with an imperforate diametrical web separating the two large openings 22 and 23 defining the gas and air passages of the preheater. The radial partitions 11 are provided with radial seals 30 adapted as the rotor turns to bear against the imperforate portions of the sector plates 21 to prevent the flow of fluids across the ends of the rotor between the gas and air passages of the preheater, the web portions being of greater width than the arcs subtended by the various sector-shaped compartments into which the rotor is divided by the partitions. In order that the streams of gas and air may not by-pass the heat transfer surface 14 by flowing in the annular clearance space 24 between the rotor shell 10 and the housing 20, it is customary to provide circumferential seals 40 on the shell 10 which wipe against imperforate portions of the sector plates 21 or allied parts so as to seal off the space 24 at both ends of the rotor.

In accordance with the present invention the circumferential seals carried by the rotor include a plurality of arcuate members 40 each of 15° or 30° extent together forming a complete circular ring at the end edges of the rotor shell 10. The sealing members 40 are slidably supported for axial movement on plates 41 each of an arcuate extent of 60° which project from the end edge of the rotor shell 10 and are fixed thereto by the bolts 42. The sealing members 40 are supported to ride up and down on the plates 41 by means of bolts 43 which extend through slots 44 in the members 40 which are larger in the direction axially of the rotor than the shanks of the bolts 43, the members being yieldingly mounted by the employment of springs 45 mounted on the bolts between the plate 41 and the nut 46.

The sealing members 40 in sections carried by the rotor shell have outwardly extending flanges 47 formed with grooves 48 that receive the arcuate flanges or shoulder portions 50 of sealing shoes 51 of 15° or 30° arcuate extent yieldingly mounted on the confronting face of the sector plate 21 so that the side faces 52 or 53 may contact the sides 54 or 55, respectively, of the grooves and associated spring 57 for slidable movement both radially and circumferentially. The bolt 56 extends through a slot 58 elongated in the radial direction to permit independent movement of each sealing shoe 51 with respect to the sealing members 40 and also to permit circumferential adjustment due to the fact that the slot 58 is wider than the shank of the bolt 56, Fig. 4. The bolts 56 also support arcuate guide plates 60 of 30° extent that extend along inwardly beneath the flanges 47 on the sealing members 40 on the rotor to maintain these members in relatively fixed positions axially with respect to the sector plates 21 despite axial expansion or contraction of the rotor. Spacing sleeves 61 are mounted on the bolts 56 between the guide plates 60 and sector plates 21.

At the inner end of the compartments there are provided sealing members 62 in 60° arcuate sections attached by shouldered studs 63 to the rotor post 12. The studs 63 extend through slots 64 in the members 62 and are provided with shoulders 65 to retain engagement with the members while providing for axial movement of the sealing members along the rotor post. At their outer ends the seals are provided with inwardly extending flanges 66 and 67 spaced by an intervening groove 68 which provides a rabbeted seal in the nature of a labyrinth in connection with the correspondingly formed flanges 70 and 71 on a cap 72 formed in two arcuate parts to extend around the rotor post 12 and attached by the bolts 73 extending through its flange 74 to the sector plate 21. The cap 72 is provided at its inner edge with packing 75 engaging the side of the supporting trunnion 76 for the rotor post.

Cast aluminum radial seals 30 (shown in section in Fig. 5) are attached at their ends by bolts 82 to lugs 80 on the rotor post seals 62 and lugs 81 on the outer circumferential sealing members 40 on the rotor shell 10. Radially elongated slots 83 in the radial seals 30 permit expansion and contraction of the associated parts in the radial direction. The interval between each radial seal 30 and the outer edge of the compartment forming partition 11 opposite which the seal is supported is closed by the spring plates 84 extending at their outer ends into grooves 85 in the radial seals. Plates 84 are held in position with relation to the partition 11 by the clamp plates 86 which are attached to the edge of the partitions by the bolts 87. The clamp plates 86 do not extend out to the inner edges of the radial seals 30 and thereby provide an expansion space 88 between their outer ends and the confronting inner edges 89 of the radial seals 30. Thus, if the rotor and partitions 11 expand in an axial direction this movement may be taken up by sliding of the spring plates 84 within the grooves 85 in the inner end edges of the radial seals 30 which are held at all times in the same plane in contact with the inner face of the sector plate 21 by their attachment to the rotor post seals 62 and circumferential sealing sections 40.

In the form shown in Fig. 6 the sealing sections 36 mounted on the end edges of the rotor have outwardly extending lateral flanges 90 behind which the guide plates 60 seat. Each sealing shoe 37 has at its outer edge a flange 91 engaged by the lever arm 92 pressed against it by a spring 93 mounted on a rod 94 connected with the other arm 95 of the lever. The arms 92, 95 are fixed to a stud 96 mounted in the side walls of a dished housing 97 fitted into an aperture 98 in the wall of the housing 20 surrounding the rotor. Adjustment of nuts on the rods 94 permit regulation from the exterior of the preheater of the pressure of the sealing shoes 37.

In operation, the circumferential seals 36 may move up and down on the end edges of the rotor shell 10 as the latter expands or contracts axially due to the fact that the guide plates 60 engage behind the flanges 90 of the sealing members 36 and thus hold them in fixed relation to the sector plate 21 from which the guide plates 60 are supported by the bolts 56. In the seal of Fig. 2 the expansion or contraction of the rotor in a radial direction would result in a sealing section 40 on the end edge 10 of the rotor effecting a corresponding movement of the sealing shoes 51 mounted on the sector plate 21 due to the engagement of the shoulder or flange 50 of the shoe 51 in the groove 48 of the sealing member 40; this movement being permitted by the elongation of the slot 58 through which the mounting bolts 56 extend. In Fig. 6 the sealing shoes 51 are maintained in engagement with the sealing surface 54 of the rotor sealing sections 36 on the rotor shell under the action of the spring pressed levers 92.

The radial sealing members 30 being attached at their inner and outer ends to the rotor post seal sections 62 and the circumferential sealing sections 36 follow the movement of the latter axially of the rotor as permitted by sliding of spring plates 84 in the grooves 85, which movement is accommodated by the expansion space 88. Thus all three seals, namely 62 at the rotor post 12, radial seals 30 on the compartment dividing partitions 11, and circumferential seals 36 at the outer circumference of the rotor remain at all times in the same plane with relation to the sealing surfaces on the sector plates 21 regardless of the shape that the rotor may take due to expansion and consequently maintain the proper sealing relationships.

What I claim is:

1. In a regenerative air preheater or the like having a cylindrical rotor shell carrying heat transfer material, and a housing surrounding the rotor and provided opposite either end of the latter with a sector plate formed with a pair of circumferentially spaced openings for the flow of heating gases and air to and through the rotor; a plurality of arcuate sealing members resiliently mounted on the outer surface of the rotor shell and together forming a circular sealing ring at or closely adjacent each end edge thereof; groups of sealing shoes of arcuate form resiliently mounted outwardly of the rotor shell on said sector plate, the shoes of each group together forming a stationary sealing ring of circular shape co-extensive with the arcuate sealing members; and means acting to maintain said arcuate shoes in sealing relation with the sealing members carried by the rotor.

2. In a regenerative air preheater having a cylindrical rotor shell carrying heat transfer material, and a housing surrounding the rotor and provided opposite either end of the latter with a sector plate formed with a pair of circumferentially spaced openings for the flow of heating gases and air to and through the rotor; arcuate sealing members together forming a circular sealing ring at each end of the rotor shell; means for resiliently mounting each of said sealing members on the end of the rotor shell for independent movement axially of the latter; groups of arcuate sealing shoes mounted in the housing radially outward of the rotor shell, the shoes of each group together forming a circular sealing ring co-extensive with the arcuate sealing members; means resiliently supporting said shoes on the inner surface of said sector plate adjacent said apertures therein for independent movement in a radial direction; a lateral flange on each of said sealing members extending radially outward from said shell beneath said sector plate and forming a shoulder opposite said sealing shoes; a flange on each of said sealing shoes engageable with the side faces of the shoulder on said sealing members; and sectorial guide plates supported on the face of each sector plate confronting said rotor and engaged behind the lateral flanges on said sealing members.

3. In a regenerative air preheater having a cylindrical rotor shell carrying heat transfer material, and a housing surrounding the rotor and provided opposite the ends of the latter with sector plates formed with a pair of circumferentially spaced openings for the flow of heating gases and air to and through the rotor; arcuate sealing members together forming a circular sealing ring at each end edge of the rotor shell; means including individual bolts and springs for resiliently mounting each of said sealing members on the end of the rotor shell for independent movement axially of the latter; groups of arcuate sealing shoes mounted in the housing radially outward of the rotor shell, the shoes of each group together forming a circular ring coextensive with the arcuate sealing members; means including individual bolts and springs for resiliently supporting said shoes on the inner surface of said sector plate adjacent said apertures therein for independent movement in a radial direction; a lateral flange on each of said sealing members extending radially outward from said shell beneath said sector plate and formed in a face thereof confronting the latter with an arcuate groove concentric with said rotor shell, the grooves in adjacent members at either end of the rotor being alined to form a continuous circular channel; a flange on each sealing shoe extending into said channel and engageable with the side faces of the grooves in said sealing members; and sectorial guide plates supporting on the face of said sector plate confronting said rotor and engaged behind the lateral flanges on said sealing members to maintain the latter positioned axially with respect to said sealing shoes on the sector plate.

4. In apparatus having a rotor made up of a cylindrical shell joined to a rotor post by radial partitions forming compartments that carry material for contact by gaseous fluids, and a housing surrounding the rotor and provided opposite either end of the later with an end plate formed with a pair of circumferentially spaced openings defining separate passages for the flow of gases to and through the rotor, imperforate portions of said end plates being located in confronting relation to the end edges of the cylindrical rotor shell; radial seal members adapted to contact imperforate portions of one sector plate intermediate the openings therein; a circumferential sealing ring slidably mounted on one end edge of the rotor and groups of arcuate shoes mounted on the end plate outwardly of said sealing ring said ring engageable with imperforate portions of said end plate in confronting relation thereto; means maintaining said ring in contact with said shoes; means connecting said sealing ring with said radial seal members for supporting the latter with their outer radial edges in contact with imperforate portions of said end plate between the apertures therein and with their inner radial edges located opposite and spaced from the radial edges of the partitions; and flexible members mounted on the radial edges of said partitions and contacting said radial seal members to bridge the gap between the latter and said partitions.

5. In apparatus having a rotor made up of a cylindrical shell joined to a rotor post by radial partitions forming compartments that carry material for contact by gaseous fluids, and a housing surrounding the rotor and provided opposite either end of the latter with an end plate formed with a pair of circumferentially spaced openings defining separate passages for the flow of gases to and through the rotor, imperforate portions of said end plates being located in confronting relation to the end edges of the cylindrical rotor shell; radial members adapted to contact imperforate portions of one sector plate intermediate the openings therein; a circumferential sealing ring slidably mounted on one end edge of the rotor and groups of arcuate shoes mounted on the end plate outwardly of said sealing ring said ring engageable with the imperforate portions of said end plate in confronting relation thereto; means maintaining said ring in contact with said shoes; means connecting said sealing ring with said radial seal members for supporting the latter with their outer radial edges in contact with imperforate portions of said end plate between the apertures therein and with their inner radial edges located opposite and spaced from the radial edges of the partitions; and seal members maintaining slidable contact between said partitions and said radial members to bridge the gap between them.

6. In a regenerative air preheater or the like having a cylindrical rotor shell carrying heat transfer material, and a housing surrounding the rotor and provided opposite either end of the latter with a sector plate formed with a pair of circumferentially spaced openings for the flow of heating gases and air to and through the rotor; a plurality of arcuate sealing members slidably mounted on the outer surface of the rotor shell and together forming a circular sealing ring at or closely adjacent each end edge thereof; groups of sealing shoes of arcuate form resiliently mounted outwardly of the rotor shell on said sector plate, the shoes of each group together forming a stationary sealing ring of circular shape co-extensive with the arcuate sealing members; and means acting to maintain said arcuate shoes in sealing relation with the sealing members carried by the rotor.

7. In a regenerative air preheater having a cylindrical rotor shell carrying heat transfer material, and a housing surrounding the rotor and provided opposite either end of the latter with a sector plate formed with a pair of circumferentially spaced openings for the flow of heating gases and air to and through the rotor; arcuate sealing members together forming a circular sealing ring at each end of the rotor shell; means for resiliently mounting each of said sealing members on the end of the rotor shell for independent movement axially of the latter; groups of arcuate sealing shoes mounted in the housing radially outward of the rotor shell, each group forming a circular sealing ring co-extensive with the arcuate sealing members; means resiliently supporting said shoes on the inner surface of said sector plate adjacent said apertures therein for independent movement in a radial direction; a lateral flange on each of said sealing members extending radially outward from said shell beneath said sector plate and forming a tongue opposite said sealing shoes; means integral with said sealing shoes and forming therewith a groove engageable with the flanges on said sealing members; and means slidably supporting said sealing shoes for movement with said sealing members on the rotor in a direction axially of the latter.

GLENN E. FLURSCHUTZ.

References Cited in the file of this patent

UNITED STATES PATENTS

| Number | Name | Date |
|---|---|---|
| 2,287,777 | Boestad | June 30, 1942 |
| 2,471,995 | Yerrick et al. | May 31, 1949 |
| 2,517,512 | Tigges et al. | Aug. 1, 1950 |
| 2,549,583 | Eckersley | Apr. 17, 1951 |

FOREIGN PATENTS

| Number | Country | Date |
|---|---|---|
| 500,682 | Great Britain | Feb. 14, 1939 |